Patented Mar. 19, 1940

2,193,963

UNITED STATES PATENT OFFICE 2,193,963

SULPHONIUM COMPOUNDS

Benjamin R. Harris, Chicago, Ill.

No Drawing. Application April 17, 1937,
Serial No. 137,496

11 Claims. (Cl. 260—399)

My invention relates to a new class of chemical substances. It is more particularly concerned with a class of chemical substances having the properties of interface modifiers when employed in treating baths.

An object of my invention is accordingly the provision of a new class of chemical substances.

Another object is the production of a class of chemical substances having utility as interface modifying agents.

Another object is the provision of treating baths comprising members of the new class of substances.

Many of the substances of my invention have useful applications in the arts where frothing, wetting, penetrating, detergent, emulsifying, and other interface modifying functions are required. I may use them in treating baths which contain aqueous media with or without other reagents for the treatment of textile fabrics, leather, mineral ores, etc. They may be employed in the treatment of wool, the dyeing of textiles, and they may be employed in conjunction with color discharging agents such as sodium sulphoxylate and sulphites, for the flotation of ores to separate mineral values from the gangue, for stuffing leather, for dye leveling, for decreasing the spattering of margarine, and for other similar purposes.

The substances of my invention are, in general, possessed of at least two groups, one having a hydrophile function and the other having a lipophile function in the molecule. The hydrophile function is performed primarily by a sulphur atom of a sulphonium radical. The lipophile group is a group having a definite affinity for oils and fats and comprises either an alkyl, aralkyl, aryl, ether, or ester group linked to a sulphur atom of a sulphonium radical. The lipophile group possesses predominantly hydrocarbon characteristics and, in general, is derived from fats, oils, waxes, mineral oils, other hydrocarbons, and the like. Ordinarily, the straight chain alkyl or acyl radicals are preferred since such radicals possess stronger lipophillic properties than the aromatic radicals such as benzene and naphthalene radicals even though the carbon content of the alphatic and aromatic radicals may be the same. I do not, however, exclude the utilization of aromatic or hydroaromatic radicals as lipophillic groups although, as stated, the aliphatic are much preferred.

Many of the compounds of my invention may be represented by the general formula

wherein $R_1$ is a lipophillic radical such as a hydrocarbon radical, preferably aliphatic, especially the radical of a polyhydroxy substance linked to an alkyl or acyl group in the form of an ester or an ether, in each case said lipophile group containing at least six carbon atoms, $R_2$ and $R_3$ are alkyl, aryl, aralkyl, cyclic, heterocyclic, or alkylol radicals, each generally possessing less than six carbon atoms, and X represents an anion such as Cl—, Br—, I—, in other words halogen, OH—, $HSO_4$—, $RSO_4$—, $C_6H_5SO_3$—, $NO_3$—, acetate, borate, phosphate, or some other suitable organic or inorganic anion.

It is evident from a consideration of the above general formula that the compounds of my invention are sulphonium compounds wherein the quadrivalent sulphur atom with its associated anion comprises the hydrophile group and performs the principal hydrophile function in the radical. Moreover, the cation portion of the molecule, comprises lipophile groups which perform a lipophile function in the molecule. As will be seen from the examples hereinafter set forth, the compounds may contain either one or more than one sulphonium radical in the molecule. Furthermore, it will be noted that the sulphonium radicals appear preferably at or near an end of the molecule as distinguished from being present, say, in the middle of the molecule. In order for the sulphonium group or groups to exert their hydrophillic properties to any noticeable extent so that the compounds readily can orientate themselves at water-oil interfaces or water-air interfaces or at interfaces of other materials in connection with which my compounds are used, the sulphonium radical should be disposed at or near an end of the molecule. It will be appreciated that with increasing lipophile mass the molecule tends to become oil-soluble and tends to alter its interface modifying properties. In most cases a proper balance must be struck between the lipophile mass, the character of the lipophile group and the nature and mass of the hydrophile group which is linked thereto, in order to obtain maximum interface modifying potency. Too great excess of lipophile or hydrophile characteristics in the molecule diminishes the value of the compound as an interface modifying agent although it may possess desirable properties for other purposes.

In addition to the hydrophillic properties exerted by the sulphonium radical, further hydrophillic characteristics can be imparted to the molecule by the introduction thereto, in known ways, of other hydrophillic groups such as sulphate, sulphonic, ammonium, hydroxy and similar groups.

The following are examples of compounds coming within the class of substances of my invention:

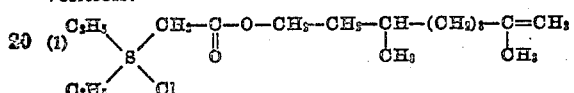
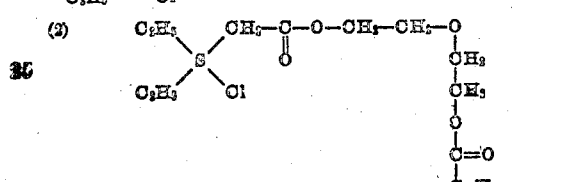
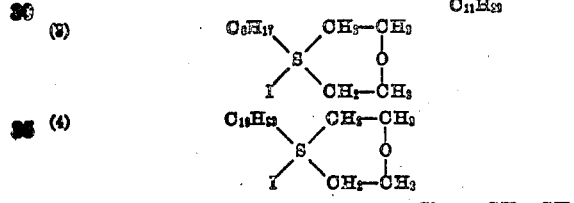
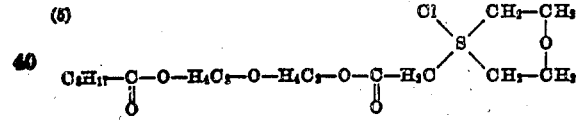
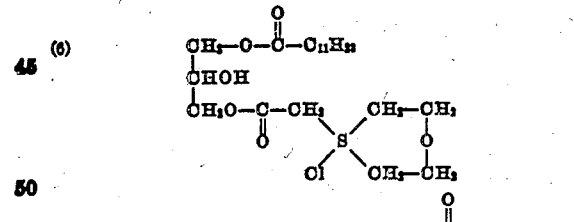
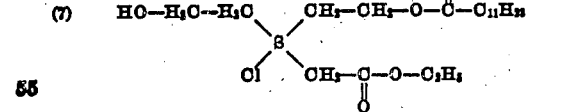
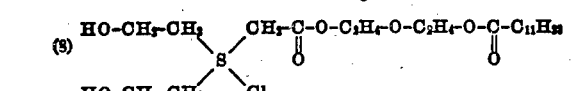
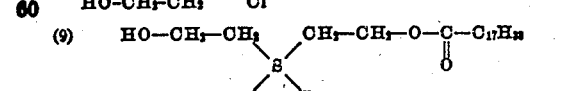
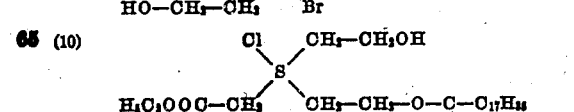
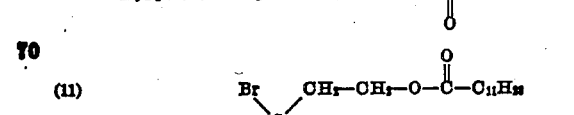
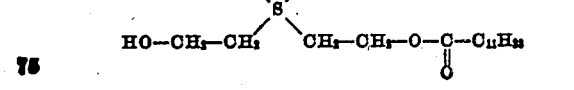
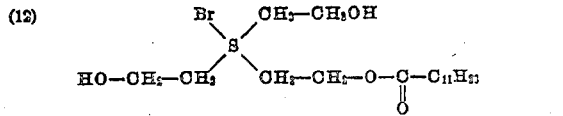
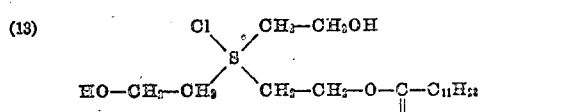
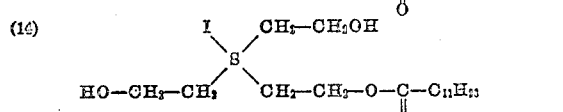
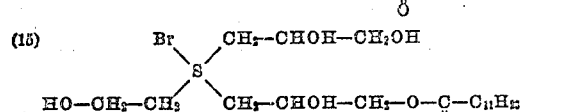
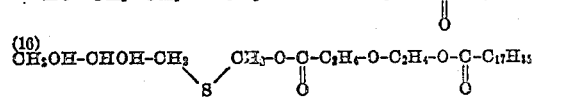
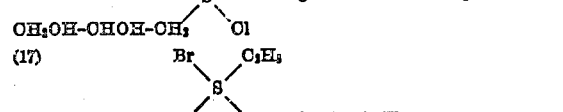
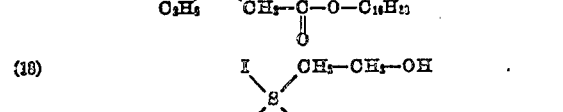
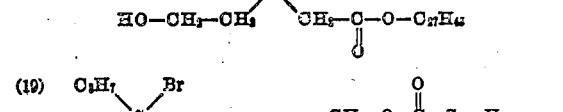
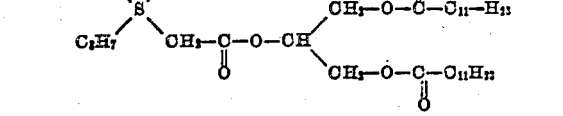
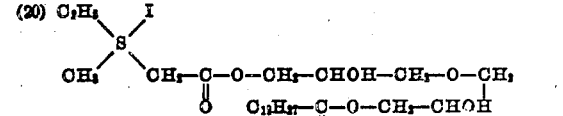
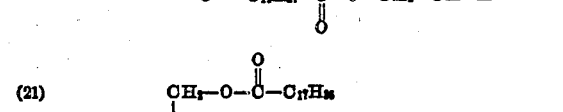
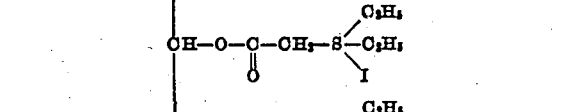
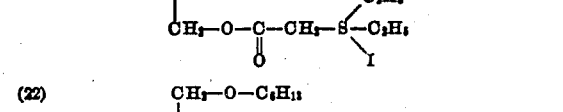
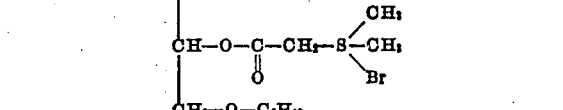
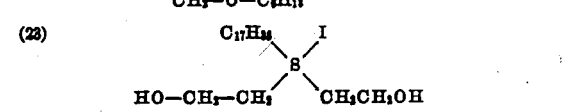
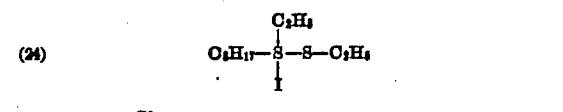
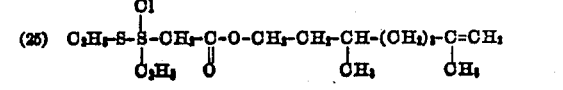

The compounds of my invention may be made in accordance with several methods. Illustrative of types of methods for producing said compounds are the following:

(1) The reaction of an acyl halide or a fatty acid with a preformed sulphonium molecule containing at least one esterifiable hydroxy group.

(2) The reaction of an acyl halide or a fatty acid with a dialkyl or aralkyl sulphide containing at least one esterifiable hydroxy group, the resulting aliphatic sulphide derivative being converted into a sulphonium compound by an addition reaction. Instead of esterifying the hydroxy group of the dialkyl or aralkyl sulphide, said hydroxy group may be etherified.

(3) The addition of a reactive halide, containing a lipophile group of at least six carbon atoms to, preferably, a low molecular weight dialkyl or aralkyl sulphide or a heterocyclic sulphur compound capable of conversion into a sulphonium compound.

(4) The addition to an unsymmetrical sulphide containing a long and a short carbon chain of a relatively low molecular weight reactive halide.

Among the reactive molecules which I may employ for the purpose of converting a divalent sulphur to a quadrivalent sulphonium sulphur, in the preparation of the compounds of my invention, may be mentioned the following:

(A) $CH_2Cl-COOH$ (B) $CH_2Cl-CO-CH_3$ (C) $CH_2Cl-COO-C_2H_5$ (D) $CH_2Cl-CH_2-O-CH_2-CH_2Cl$ (E) $ClCH_2-\langle\ \rangle$ (F) $ClCH_2-CO-\langle\ \rangle-OH$ (G) $ClCH_2-C(=O)-\langle\ \rangle$ (H) $Cl-\langle\ \rangle-NO_2$ (I) $BrCH_2-CH_2OH$ (J) $ICH_2-CHOH-CH_2OH$ (K) $C_2H_5I$ (L) $(CH_3)_2SO_4$ (M) $CH_3-\langle\ \rangle-S(=O)(=O)-OCH_3$ The compounds listed immediately above may be reacted with, preferably, an unsymmetrical sulphide containing a long carbon chain and a short carbon chain to produce sulphonium compounds in accordance with certain aspects of my invention. It will, of course, be appreciated that the reactivity of said reactive molecules varies, and this reactivity is also influenced by the conditions of the reaction in which they are utilized.

Other reactive halides which may be employed in the preparation of many of the compounds of my invention are as follows:

(I) $C_{15}H_{31}-O-\overset{O}{\underset{\|}{C}}-CH_2Cl$ (II) 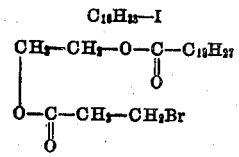

(III) 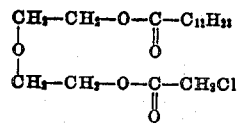

(IV) $C_{12}H_{25}-I$ (V) 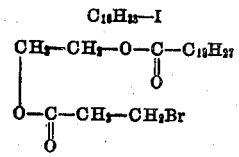

(VI) Mono-halogeno-acetic acid esters of coconut mono fatty acid esters of ethylene glycol, diethylene glycol, and other polyhydroxy substances.

Said halides referred to immediately hereinabove may be reacted with low molecular weight alkyl sulphides such as, for example, di-ethyl sulphide $$\left(\begin{matrix}C_2H_5\\ S\\ C_2H_5\end{matrix}\right)$$

to produce compounds falling within the scope of my invention.

The sulphides which may be utilized in the preparation of the compounds of my invention may be derived in various ways in accordance with procedures known in the art. Thus, for example, ethylene may be reacted with sulphur chloride ($S_2Cl_2$) to produce the compound.

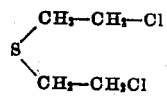

The reaction requires considerable care in performance since the product is extremely toxic, as is well understood in the prior art. This sulphide may, for example, be reacted with chlor- or brom- acetic acid to produce the following compound by an addition reaction:

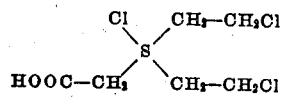

This latter sulphonium compound may be esterified with a higher alcohol like lauryl, myristyl, cetyl or oleyl alcohol, or it may be esterified with a higher alkyl or acyl derivative of a polyhydroxy substance such as mono-laurin, monostearin, mono-cetyl glycerol ether or the like, to produce compounds falling within the scope of my invention. Alternatively said compound

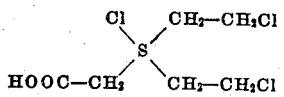

may be heated or otherwise reacted with soaps such as sodium stearate to form esters. Other sulphides which I may employ as intermediates are by-product mercaptans and sulphides obtained in the petroleum industry, particularly such as are derived from the refining of cracked petroleum distillates. Again, the sulphides may be synthesized in known ways. For example, methyl chloracetate may be reacted with methyl sodium sulphide in accordance with the following reaction:

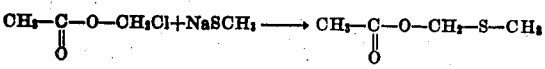

The following examples are illustrative of methods of producing various of the compounds falling within the scope of my invention. It will be understood, however, that said examples are given only by way of illustration and are not to be construed as limitative of my invention. It will be appreciated that the invention is susceptible of variation and modification, particularly with regard to the reacting ingredients, the proportions employed, the time and temperature of reaction, the exact mode of procedure, etc. All such variations I regard within the skill of chemists versed in the art in the light of my teachings herein and, therefore, within the scope of my invention.

*Example A*

To prepare the compound $$R\overset{O}{\underset{\|}{C}}-O-CH_2CHOH-CH_2O-\overset{O}{\underset{\|}{C}}-CH_2\overset{Cl}{\underset{}{S}}\diagdown\begin{matrix}CH_2-CH_2\\ \diagup\\ CH_2-CH_2\end{matrix}\diagdown O$$

(RC- is mixed coconut oil fatty acid acyl radical)

17 parts of the α coconut oil fatty acid ester α' chloracetic acid ester of glycerol and 5 parts of 1,4 thioxane were mixed together and allowed to stand for a considerable period of time until a precipitate was formed. The precipitate was washed twice with ether and the adhering ether was then allowed to evaporate from the precipitates. The resulting product, indicated above, had good foaming properties in water.

*Example B*

To prepare the compound $$C_{16}H_{33}\overset{}{\underset{I}{S}}\diagdown\begin{matrix}CH_2-CH_2\\ \diagup\\ CH_2-CH_2\end{matrix}\diagdown O$$

10 parts of cetyl iodide were mixed with 3 parts of 1,4 thioxane and the procedure was the same as described above in Example A. The resulting product, when dissolved in hot water, had good foaming properties.

*Example C*

To prepare thiodiglycolmonostearate, represented by the following formula:

$$C_{17}H_{35}-\overset{O}{\underset{\|}{C}}-O-CH_2CH_2-S-CH_2CH_2OH$$

130 parts of thiodiglycol were dissolved in an equal weight of pyridine. Stearoyl chloride was then added dropwise to the solution of thiodiglycol and pyridine until 303 parts of the stearoyl chloride were added, the reaction vessel being kept in an ice water bath during the addition of the stearoyl chloride and the mixture was continually stirred. After the addition of the stearoyl chloride was completed, the reaction mixture was permitted to stand for about 24 hours. The product was then washed several times with hot water until the fatty layer was substantially free from pyridine. The product was then dried in an oven at 105 degrees C. At room temperature, it was a solid substance which was easily crushed to a white powder. This compound can be converted into sulphonium compounds by reaction with a reactive alkyl halide such as methyl iodide or the like.

*Example D*

To prepare thiodiglycolmonooleate, corresponding to the following formula $$C_{17}H_{33}-\overset{O}{\underset{\|}{C}}-O-CH_2CH_2-S-CH_2CH_2OH$$

737 parts of thiodiglycol were mixed with 904 parts of oleic acid and the mixture was heated at 220 degrees C., with stirring, for about 3 hours, until substantially all of the free fatty acid has entered into combination with the thiodiglycol. The resulting ester was then washed a few times with hot water in order to remove the excess of thiodiglycol and the product was finally dried at 100 degrees C. It was of medium brown color and had a characteristic sulphur-compound odor. As in the case of the compound of Example C, the sulphonium compounds can be prepared by reaction with reactive alkyl halides or the like.

*Example E*

In order to prepare the compound $$C_{11}H_{23}-\overset{O}{\underset{\|}{C}}-O-CH_2CH_2\diagdown\underset{HOCH_2CH_2}{\overset{}{S}}\diagup\overset{CH_2CH_3}{\underset{I}{}}$$

164 parts of ethyl iodide were refluxed for one-half hour with 120 parts of thiodiglycol on a hot water bath. The reaction product was then dissolved in an equal quantity, by weight, of pyridine, and then 220 parts of lauroyl chloride were added dropwise to the mixture which was stirred and cooled. The resulting product was washed with petroleum ether until free of pyridine. The resulting sulphonium compound, the structural formula of which is set out above, had good properties as a detergent, foaming agent, surface tension reducing agent and, in general, had good interface modifying properties.

*Example F*

To prepare the compound $$C_{11}H_{23}\overset{O}{\underset{\|}{C}}-O-CH_2CH_2\diagdown\underset{HOCH_2CH_2}{\overset{}{S}}\diagup\overset{CH_2CH_2OH}{\underset{Br}{}}$$

122 parts of thiodiglycol, 80 parts of ethylene bromhydrin, and 220 parts lauroyl chloride were reacted successively, the same procedure being followed as described in Example E. The resulting compound had good foaming properties in the presence of either acid or alkali, was a detergent and effectively reduced the surface tension of water.

*Example G*

In order to prepare the compound $$C_{11}H_{23}\overset{O}{\underset{\|}{C}}-O-CH_2-CHOH-CH_2\underset{Cl}{\overset{}{S}}-CH_2-CHOH-CH_2OH\quad\begin{matrix}CH_2-CHOH-CH_2OH\\ |\\ \end{matrix}$$

182 parts of thiodiglycerol and 110 parts of glycerolchlorhydrin were heated for about 20 hours on a boiling water bath. When the reaction was substantially completed, an equal weight of pyridine was added. The whole was then mixed and to this mixture, which was continually stirred and cooled in an ice bath, 220 parts of lauroyl chloride were added dropwise. After all the lauroyl chloride had been added, the reaction mixture was permitted to stand for 24 hours at room temperature. The product was purified by washing with petroleum ether until free of pyridine, the resulting product having good surface tension reducing properties and good foaming and detergent properties.

*Example H*

To prepare the compound $$C_{11}H_{23}\overset{O}{\underset{\|}{C}}-O-CH_2CHOH-CH_2\underset{Br}{\overset{}{S}}-CH_2CHOH-CH_2OH\quad\begin{matrix}CH_2CH_2OH\\ |\\ \end{matrix}$$

182 parts of thiodiglycerol, 125 parts of ethylene bromhydrin, and 220 parts of lauroyl chloride, all parts being by weight, were reacted following the same procedure as set forth above in Example G. The resulting product has good foaming and surface tension reducing properties.

I may select many different groups of lipophile materials for the lipophile portion or portions of the compounds of my invention. For example, the lipophile group may include any organic acid group, particularly fatty acid groups having preferably at least 6 carbon atoms such as the fatty acid radicals of the following acids: caproic, capric, caprylic, higher molecular weight saturated and unsaturated aliphatic and fatty acids including palmitic acid, stearic acid, lauric acid, melissic acid, oleic acid, myristic acid, ricinoleic acid, linoleic acid, mixed fatty acids derived from animal or vegetable fats and fish oils such as lard, oleo oil, coconut oil, corn oil, cottonseed oil, partially or completely hydrogenated vegetable oils such as cottonseed oil, corn oil, sesame oil and fatty acids of various waxes such as beeswax and carnauba wax, hydroaromatic acids such as abietic acid, aromatic acids such as benzoic acid, benzoylbenzoic acid, naphthoic acid, toluic acid, and other acids such as naphthenic acids. Similarly, the lipophile group may be an alkyl radical derived from an alcohol corresponding to any of the preceding acids, such as octanol, cetyl alcohol, stearyl alcohol, oleyl alcohol, lauryl alcohol, higher saturated and unsaturated aliphatic alcohols derived from natural fats and oils including sperm oil, wool fat alcohols such as cholesterol, etc.

In those of my compounds wherein the lipophile portion of the molecule is linked to the quadrivalent sulphur through a polyhydroxy substance, the polyhydroxy substances utilized may be of various types. I have found polyhydroxy substances such as sugars, sugar alcohols, glycols, polyglycols such as diethyleneglycol, glycerol, polyglycerols, and hydroxycarboxylic acids to be particularly suitable. Other polyhydroxy substances, which may be employed within the scope of my invention, are mucic acid, tartaric acid, saccharic acid, gluconic acid, glucuronic acid, gulonic acid, mannonic acid, trihydroxyglutaric acid, glyceric acid, and the like, as well as carboxylic oxidation products of polyglycerols which may be represented by the formulae:

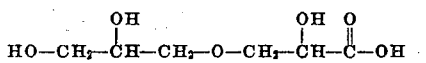
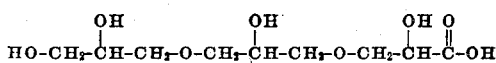
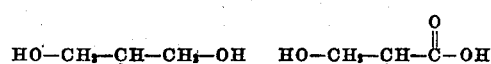
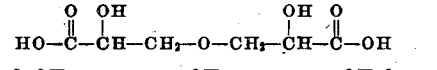
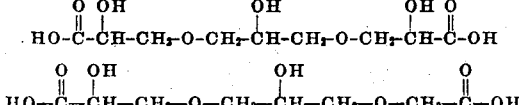

Among the sugars and sugar alcohols which I may employ, the following may be mentioned: xylose, galactose, fructose, maltose, glucose; sorbitol, mannitol, dulcitol, arabitol and other sugar alcohols such as hexahydric alcohols derived from sugars, and other similar substances having free hydroxy groups. The above mentioned polyglycerols and their oxidation products may be produced in known ways as, for example, by polymerizing glycerine, preferably by heating with about 1% of alkali at temperatures from 250 degrees C. to 260 degrees C. for about three hours in the presence of an inert gas such as nitrogen or carbon-dioxide. This reaction will give a mixture of various polyglycerols, the size of the molecules depending upon the time of polymerization, when other conditions are maintained constant. The mixture of polyglycerols is then oxidized with mild oxidizing agents to convert at least one of the primary hydroxy groups to a carboxylic group.

While I have gone into considerable detail in explaining my invention, the scope thereof is not to be restricted except by the appended claims.

Wherever the term "higher" is employed, it will be understood to mean at least six carbon atoms unless otherwise specifically stated.

What I claim as new and desire to protect by Letters Patent of the United States is:

1. Chemical compounds corresponding to the general formula

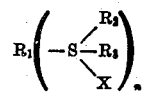

wherein $R_1$ is a lipophile radical in the form of a higher molecular weight aliphatic carboxylic acid ester of an aliphatic polyhydroxy substance, $R_2$ and $R_3$ are radicals of the group consisting of alkyl, aryl, aralkyl, cyclic, heterocyclic, and alkylol, X is an anion, and $n$ is a small whole number.

2. The compounds of claim 1 wherein the polyhydroxy substance of $R_1$ is a member of the group consisting of glycerol, glycols, polyglycerols, polyglycols, sugars, sugar alcohols, and hydroxycarboxylic acids.

3. The compounds of claim 1 wherein $R_1$ is the radical of a higher fatty acid ester of a polyhydroxy substance, the higher fatty acid radical of which contains at least six carbon atoms.

4. The compounds of claim 1 wherein $R_1$ is the radical of a higher fatty acid ester of glycerol, the higher fatty acid radical of which contains at least six carbon atoms.

5. The compounds of claim 1 wherein $R_1$ is the radical of a higher fatty acid ester of a glycol, the higher fatty acid radical of which contains at least six carbon atoms.

6. Chemical compounds corresponding to the general formula

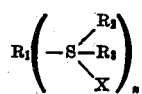

wherein $R_1$ is an aliphatic lipophile radical containing at least six carbon atoms and having an ester linkage therein, $R_2$ and $R_3$ are radicals of the group consisting of alkyl, aryl, aralkyl, cyclic, heterocyclic, and alkylol, X is an anion, and $n$ is a small whole number.

7. The compounds of claim 1 wherein X is halogen.

8. The compounds of claim 6 wherein X is halogen.

9. The compounds of claim 1 wherein $R_1$ is the radical of a fatty acid ester of glycerol wherein the fatty acid radical contains between twelve and eighteen carbon atoms.

10. Chemical compounds corresponding to the general formula $$\begin{array}{c} R_2 \\ \diagdown \\ R_3 \end{array} S \begin{array}{c} X \\ \diagup \\ \diagdown \\ R_4-O-\underset{\underset{O}{\|}}{C}-R \end{array}$$

wherein $R_2$ and $R_3$ are radicals of the group consisting of alkyl, aryl, aralkyl, cyclic, heterocyclic and alkylol, X is an anion, R comprises an aliphatic lipophile radical comprising at least six carbon atoms, and $R_4$ is the radical of an aliphatic polyhydroxy substance.

11. Chemical compounds corresponding to the general formula $$\begin{array}{c} R_2 \\ \diagdown \\ R_3 \end{array} S \begin{array}{c} X \\ \diagup \\ \diagdown \\ CH_2-\underset{\underset{O}{\|}}{C}-O-R_4-O-\underset{\underset{O}{\|}}{C}-R \end{array}$$

wherein $R_2$ and $R_3$ are radicals of the group consisting of alkyl, aryl, aralkyl, cyclic, heterocyclic and alkylol, X is an anion, R comprises an aliphatic lipophile radical comprising at least six carbon atoms, and $R_4$ is the radical of an aliphatic polyhydroxy substance.

BENJAMIN R. HARRIS.